H. G. GINACA.
AUTOMATIC FRUIT CORER AND SIZER.
APPLICATION FILED JULY 11, 1911.

1,039,926.

Patented Oct. 1, 1912.
6 SHEETS—SHEET 1.

Fig. 1.

Witnesses.
D. W. Edelin.
G. Burroughs

Inventor:
H. G. Ginaca
by
Pennie Goldsborough & O'Neill
attys.

Fig. 3.

UNITED STATES PATENT OFFICE.

HENRY GABRIEL GINACA, OF HONOLULU, TERRITORY OF HAWAII.

AUTOMATIC FRUIT CORER AND SIZER.

1,039,926.  Specification of Letters Patent.  Patented Oct. 1, 1912.

Application filed July 11, 1911. Serial No. 637,877.

*To all whom it may concern:*

Be it known that I, HENRY GABRIEL GINACA, a citizen of the United States, residing at Honolulu, county of Honolulu, Territory of Hawaii, have invented certain new and useful Improvements in Automatic Fruit Corers and Sizers; and I do hereby declare the following to be a full, clear, and exact description of the invention, such as will enable others skilled in the art to which it appertains to make and use the same.

This invention relates to machines for treating fruit, such as pineapples, to prepare the same for canning.

The object of the invention is to produce a machine of this character which shall core, size, and remove the outer portion with rind, and accomplish these ends automatically and in a more rapid and efficient manner than heretofore.

The invention contemplates means for receiving a fruit and carrying it to the operating position, where it is then centered and held above a block, means for simultaneously coring, sizing and parting the outer portion with rind, means for then separating said outer portion with rind from the cored and sized fruit, and means for accomplishing these operations in an automatic and rapid manner.

It also contemplates the employment of a coring tube, a sizing tube and a stripper, preferably of the type described in the patent to L. E. Arnold, No. 1,006,621, of October 24, 1911.

The invention is illustrated in the accompanying drawings, forming a part of this specification, in which—

Referring to the drawings, the table 1 is supported by the front legs 2 and 3 and by the rear legs 4 and 5. These legs are made from square bars turned to pass through holes in the table 1, and threaded to receive the nuts 6 above the table, which clamp the latter firmly to the shoulders formed at the upper ends of the square portions of said legs. The rear legs 4 and 5 are extended above the nuts 6 to form vertical guide bars 7 and 8. The yoke 9 is secured to the upper ends of the vertical guide bars 7 and 8. Angle irons 10 connect the lower ends of the front legs 2 and 3 and the rear legs 4 and 5 respectively. Pipe separators 11 with the bolts 12 connect the legs 2 and 4, and the legs 3 and 5 respectively. The table 1 is preferably an iron casting having a longitudinal opening in its center, and provided with bosses and ribs as shown.

Figures 5, 7:
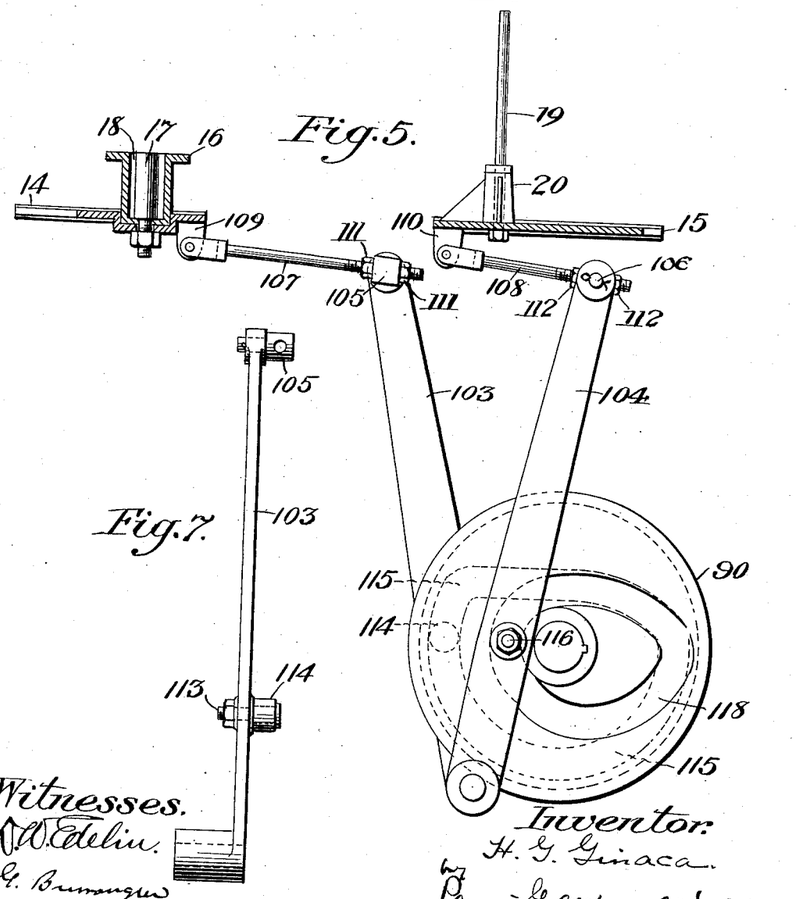
Fig. 5 is a sectional elevation of the two carriages and their operating mechanism.
Fig. 7 is an elevation of one of the levers for operating a carriage.

The carriages 14 and 15 are adapted to slide longitudinally between the two guide bars 13 and the table 1 within the opening in said table. The block 16 is secured above the carriage 14 by the stud 17, leaving an annular space 18 between said block and stud, Fig. 5. Two vertical rods 19 are secured in the bosses 20 above the carriage 15. A sleeve 21 is slipped over each rod 19, and three curved fingers 22 are clamped by the bolts 23 to each sleeve 21, with their concave sides toward the center of the machine so as to form an opening between said fingers to receive a fruit to be treated. The lowest curved finger 22 on each sleeve 21 is provided with a thin horizontal plate 24 on its lower inner concave edge, and with a lug 25 on its outer surface. A downwardly projecting stud 26 is secured in each lug 25. Extra sets of curved fingers 22 clamped to sleeves 21 may be provided, each set having fingers of larger or smaller curvature to suit various sizes for fruit to be treated, the sets being quickly interchanged.

Figure 1:
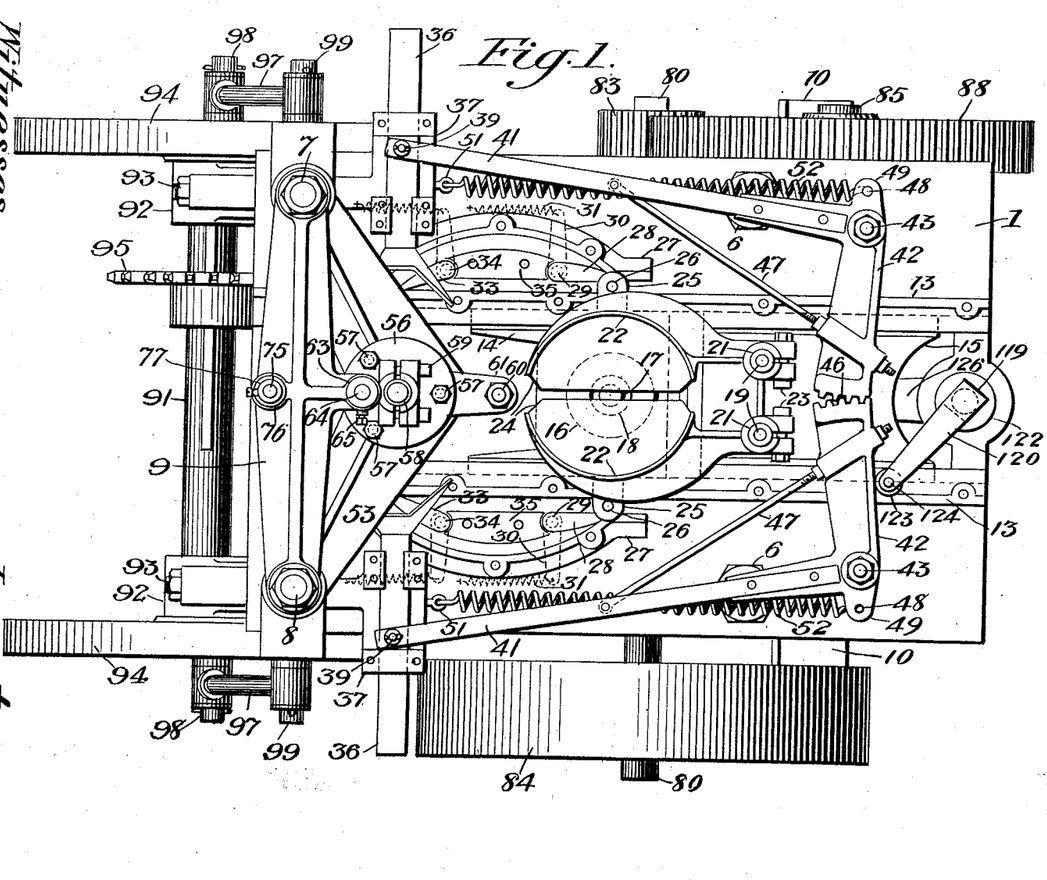
Figure 1 represents a top plan view of a machine embodying my invention.
Figure 4:
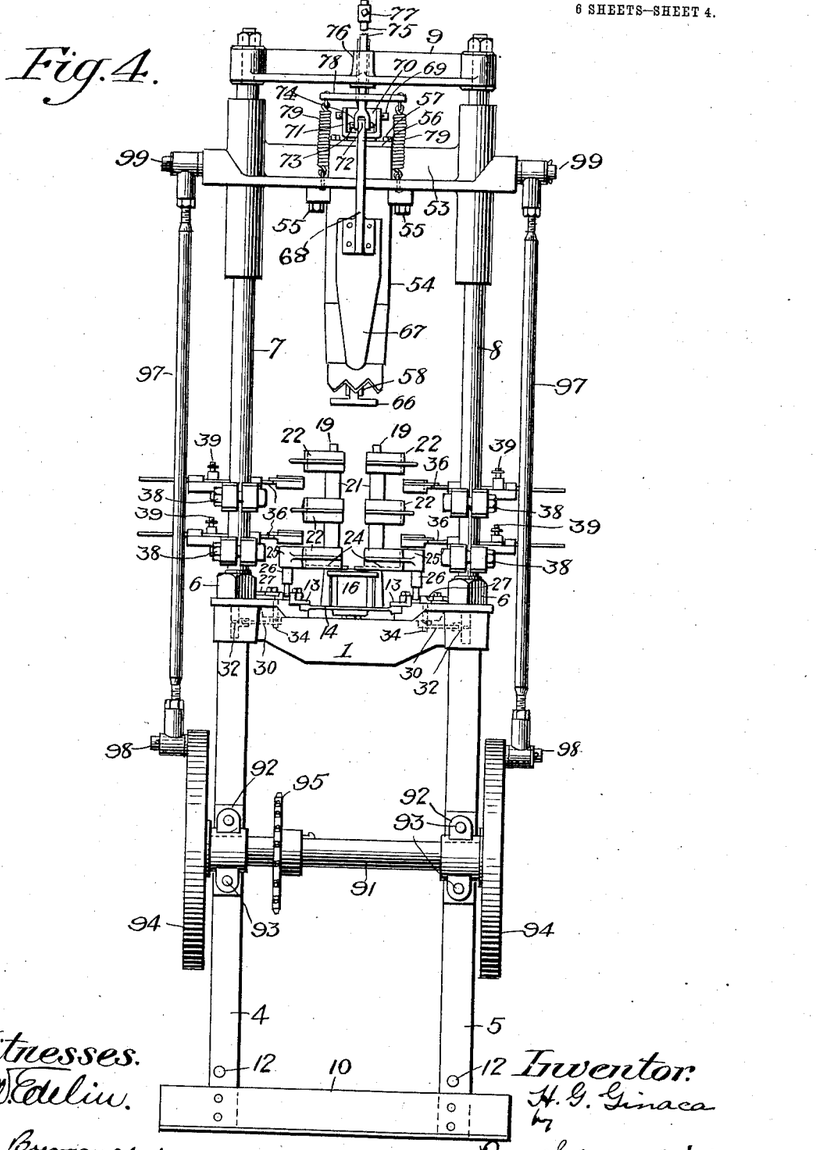
Fig. 4 is an elevation of the rear end.

A curved guide bar 27 is secured on each side of the top of the table 1, as shown in Fig. 1. A tongue 28 is provided inside of the forward curved portion of the curved guide bars 27 and outside of the longitudinal guide bars 13, and are hinged by the pin 29 through the table 1 to form a switch. A lever 30 is secured to each pin 29 below the table 1. A tension spring 31 is attached to the end of each lever 30 and to a stud 32 to hold each tongue 28 normally against the curved guide bar 27, Figs. 1 and 4. Similar tongues 33 are provided between the rear curved portion of the curved guide bars 27 and outside of the longitudinal guides 13, and are hinged on their pins 34 through the table 1. The tongues 33 are held normally against the longitudinal guides 13 by means of the tension springs 31 connected to the levers 30 on the pins 34 and to the studs 32 below the table. Guide blocks 35 are secured to the table 1 between the hinged ends of the tongues 28 and 33. The studs 26 are adapted to travel in the grooves formed between the longitudinal guides 13, the curved guide bars 27, the tongues 28 and 33, and the guide blocks 35, when the carriage 15 is moved longitudinally as hereinafter described.

Figures 8, 9, 10, 11:
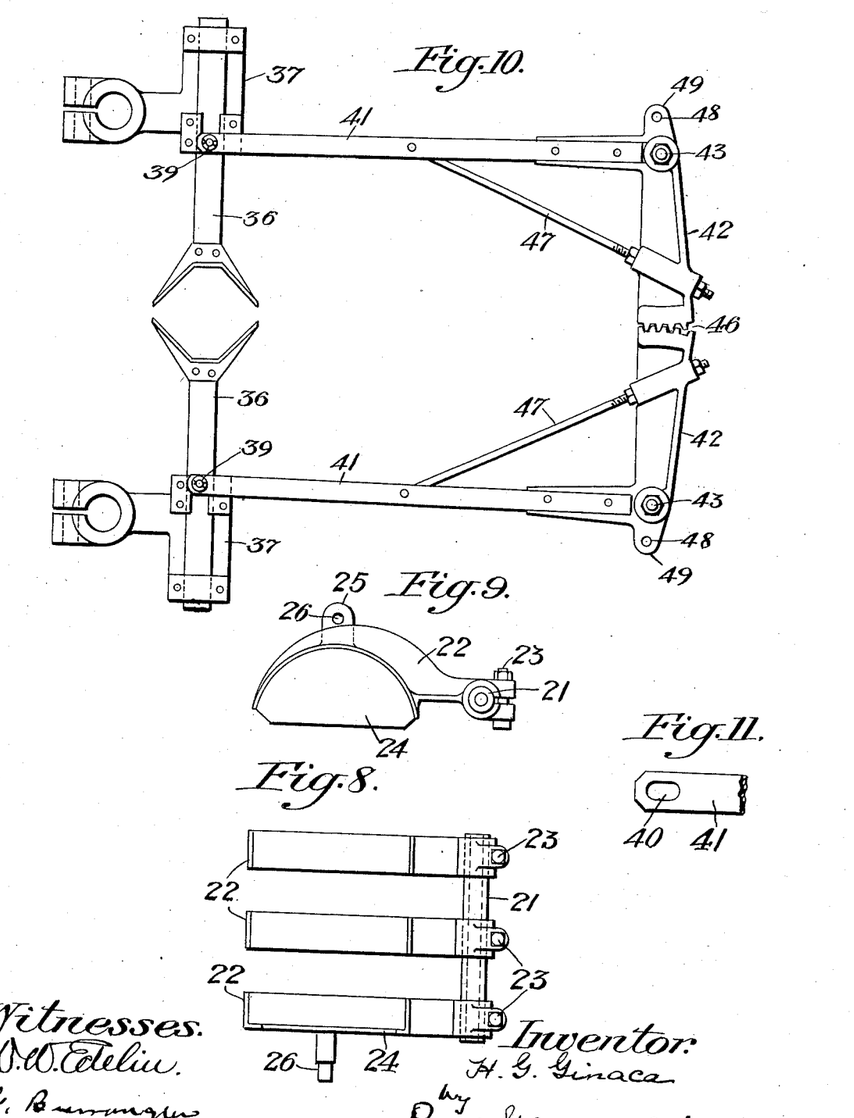
Fig. 8 is an elevation of one of the sleeves with the three curved fingers clamped thereon.
Fig. 9 is a plan view of Fig. 8.
Fig. 10 is a detail showing in plan one set of forks with connecting mechanism for clamping and centering a fruit.
Fig. 11 is a detail showing the end of one of the flat bars shown in Fig. 10.

The forked-end bars 36 are adapted to slide transversely in the guide brackets 37 clamped by the bolts 38 to the vertical guide bars 7 and 8 respectively. Two pairs of oppositely disposed forked-end bars 36 are illustrated, and are located so as to clear the curved fingers 22 when operating. Each forked-end bar 36 is provided with a pin 39, and the elongated hole 40 in the end of each flat bar 41 fits over one of the pins 39. The flat bar 41 is adjustably secured to the bell crank lever casting 42 pivoted on the stud 43 in the post 44 secured to the top of the table 1 by the nut 45. This lever casting 42 is provided with gear teeth 46, and with a rod bolt 47 for bracing and for adjusting the angular relation of the flat bar 41 to said lever casting 42. A stud 48 under the arm 49 of the lever casting 42 is provided with an eye-bolt 50. An eye-bolt 51 is secured to the guide bracket 37. A tension spring 52 connects the eye-bolts 50 and 51. The teeth 46 of each pair of lever castings 42 are made to mesh, so that a movement of one of the forked-end bars 36 produces a corresponding movement in the opposite direction of the other forked-end bar, by means of the lever connections as clearly shown in Fig. 10. The forked-end bars 36 of each pair are adjusted, by means of the rod bolts 47, so that the forks will at all times be equi-distant from the center of the machine. The forked-end bars 36 are provided with the forked ends shaped as shown in order that each pair may grip various sizes of fruit in four points of contact and center the fruit.

The cross-head 53 is adapted to slide on the vertical guide bars 7 and 8. The sizing tube 54 is bolted under the cross-head 53 and over the operating center of the machine by the bolts 55. A casting 56 is secured by the bolts 57 to the cross-head 53 above the sizing tube 54. A coring tube 58 is clamped vertically in the casting 56 by the bolts 59, with its center coincident with the operating center of the machine. The sizing tube 54 is provided with an opening 54$^a$ for access to the lower bolts 59, Figs. 2 and 3. A knife bar 60 is secured to the lug 61 of the cross-head 53 and in front of the sizing tube 54. A knife 62 is attached to the lower end of the knife bar 60 with its cutting edge downward and extending rearward to the sizing tube 54. The stripper rod 64 is adjustably secured in the boss 63 of the yoke 9 by the set screw 65, and said rod projects downward through the casting 56, the cross-head 53, and the sizing tube 54, and in the rear of the coring tube 58. A stripping ring 66 is secured to the lower end of the rod 64, and is made smaller than the bore of the sizing tube 54, and the hole in said ring is made larger than the coring tube 58.

A curved plate 67, which fits the outside of the sizing tube 54, is attached to a bell crank lever 68. The forked end 71 of this bell crank lever 68 is pivoted by the pin 69 to the lug 70 on the rear of the casting 56. The end 72 of the bell crank lever 68 is pivoted by the pin 73 to the forked end 74 of the rod 75 which is adapted to slide vertically in the boss 76 at the rear of the yoke 9. The rod 75 is provided with a set collar 77 near its upper end, and with a cross-bar 78 above the forked end 74. Tension springs 79 connect the ends of the cross-bar 78 with the cross-head 53, to hold the curved plate 67 normally against the sizing tube 54, Fig. 4.

Figure 2:
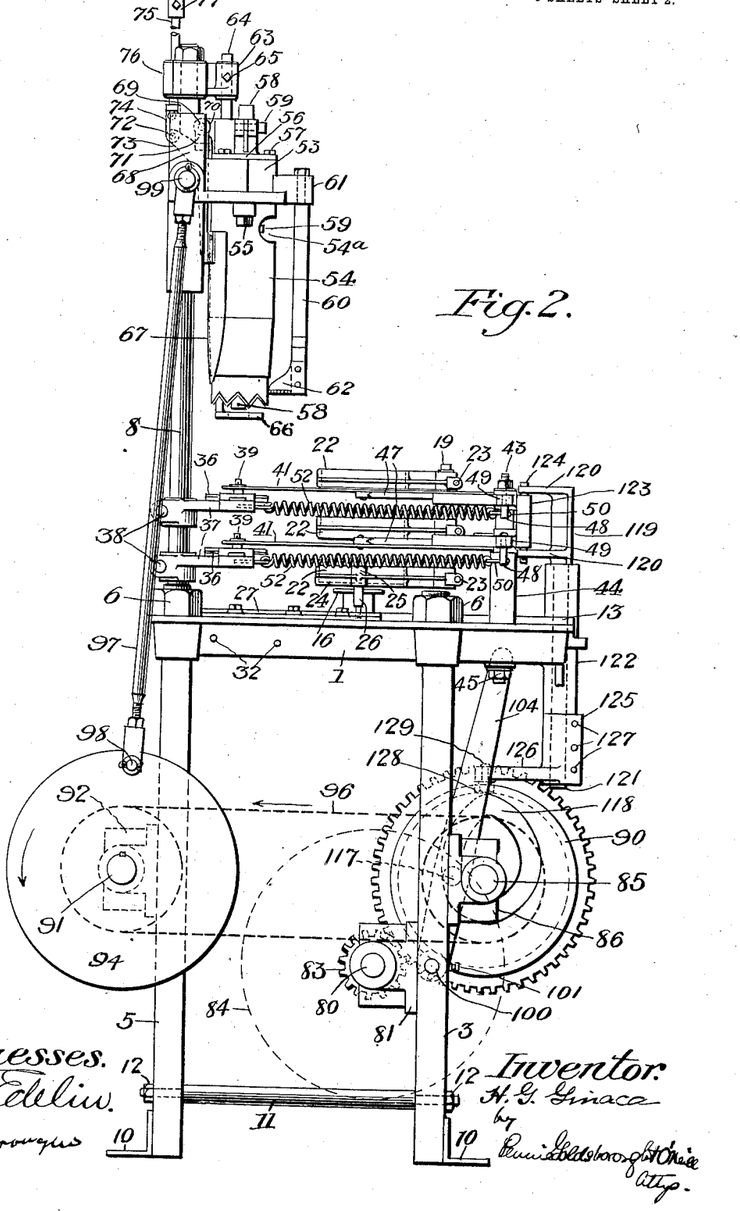
Fig. 2 is a side elevation of the same.
Figure 3:
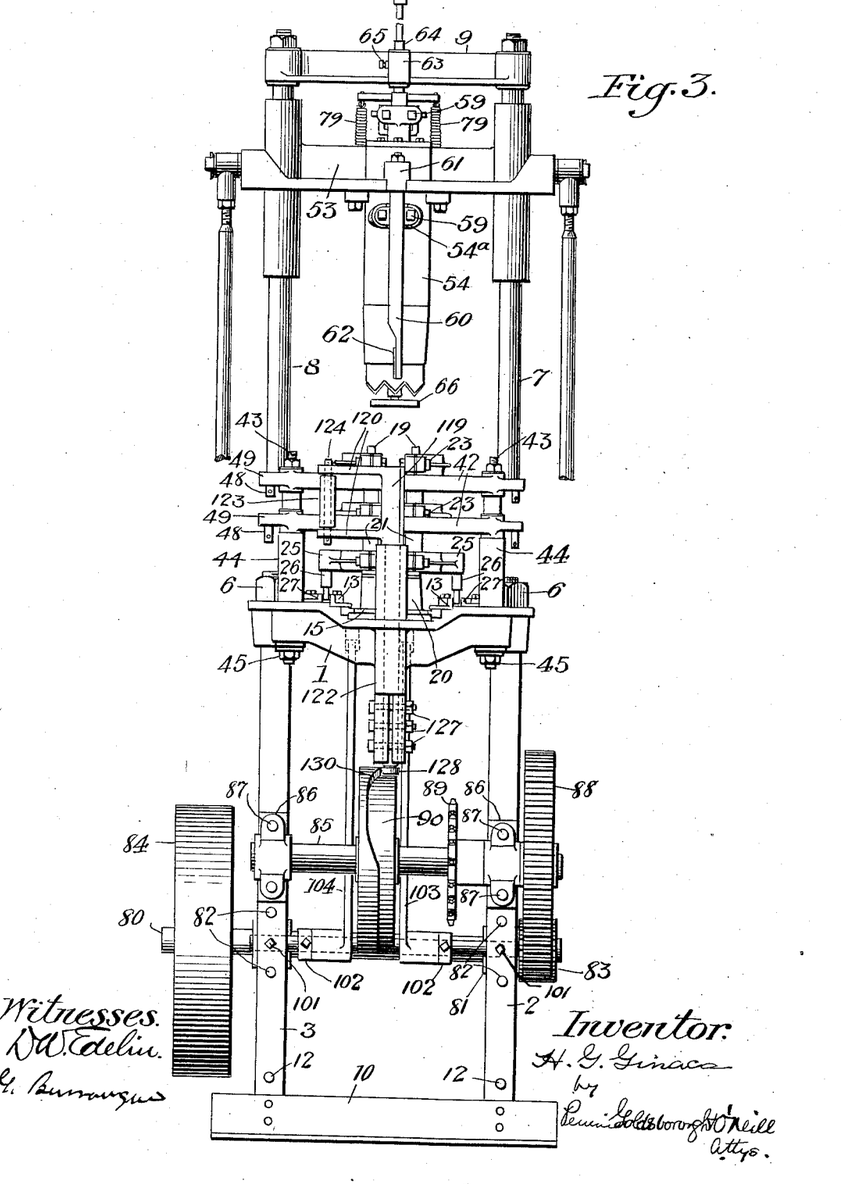
Fig. 3 is an elevation of the front end.

The driving shaft 80 is journaled in the boxes 81 secured by the bolts 82 to the rear of the front legs 2 and 3 respectively, Figs. 2 and 3. A pinion 83 and a driving pulley 84 are keyed to the shaft 80 outside of the boxes 81. The cam shaft 85 is journaled in the boxes 86 bolted by the bolts 87 to the front of the legs 2 and 3. The cam shaft 85 is driven by the gear 88 which meshes with the pinion 83, and is provided with a chain wheel or sprocket 89 and with a cam wheel 90. The crank shaft 91 is journaled in the boxes 92 bolted by the bolts 93 to the rear of the rear legs 4 and 5. A disk 94 is secured to each end of the crank shaft 91 outside of the boxes 92, and a sprocket 95 is keyed to said shaft between said boxes. A link belt 96 is provided over the sprockets 89 and 95 for driving the crank shaft 91. Connecting rods 97 connect the crank pins 98 in the disks 94 with the pins 99 in the cross-head 53 in a well known manner.

Figure 6:
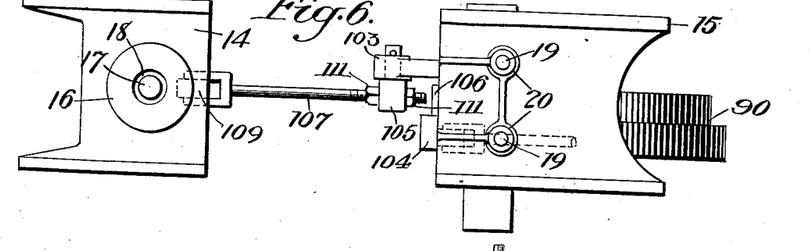
Fig. 6 is a plan view of the parts shown in Fig. 5.

The fulcrum bar 100 is secured in holes in the front legs 2 and 3 by the set screws 101, and is provided with two set collars 102. The two levers 103 and 104, which are similar and of the third class, are fulcrumed on the bar 100 on opposite sides of the cam wheel 90 with the set collars 102 adjacent to their hubs. The blocks 105 and 106 are adapted to turn in the upper ends of the levers 103 and 104 respectively, Figs. 5, 6 and 7. The forked-end bolt 107 is hinged to the lug 109 under the forward end of the carriage 14, and is bolted through the block 105 by the nuts 111 at the front and rear of said block. The forked-end bolt 108 is hinged to the lug 110 under the rear end of the carriage 15, and is bolted through the block 106 by a nut 112 at the front and rear of said block. The lever 103 is provided with a shouldered bolt 113 and with a roller 114 adapted to turn thereon. A groove 115 is provided in the right hand side or face of the cam wheel 90 in which the roller 114 travels when the cam wheel 90 is revolved. A similar shouldered bolt 116 with a roller 117 is provided for the lever 104. A groove 118 is provided in the left hand side or face of the cam wheel 90 for the roller 117. A casting 119 having two arms 120 is secured to the upper end of the bar 121, which is adapted to turn in the vertical cylindrical boss 122 at the center of the front end of the table 1. A roller 123 is provided between the arms 120 on the pin 124 through said arms, and is adapted to engage the front of one of each pair of lever castings 42 on the left side of the machine. The hub 125 of the lever 126 is clamped to the lower end of the bar 121 by the bolts 127. A roller 128 is provided under the end of the lever 126 to turn on the stud 129, and is adapted to follow the cam 130 on the periphery of the cam wheel 90.

In operation, a belt from any suitable source of power is applied to the pulley 84. A fruit is dropped into the opening between the curved fingers 22 on the two sleeves 21, and upon the horizontal plates 24, when they are in the position as shown in Fig. 1. Pineapples preferably have their ends cut off previously to being fed to the machine. As the cam wheel 90 advances, in the direction as shown by the arrows, the levers 103 and 104 are swung rearward on the fulcrum bar 100, by means of the rollers 114 and 117 rolling in the grooves 115 and 118 of the cam wheel 90 respectively, thereby pushing the carriages 14 and 15 rearward until the center of the block 16 and the center of the curves of the fingers 22 are both coincident with the operating center of the machine. The forked-end bars 36 of each pair are now allowed to rapidly approach one another, the cam 130 being cut away to relieve the pressure of the roller 117 against the crank castings 42 and permit the tension springs 52 to pull said crank castings such that their gear ends 46 move forward. The forks of the forked-end bars 36 enter the spaces between the curved fingers 22 and grip the fruit, one pair near the bottom and the other pair near the top of the fruit regardless of its size or shape or of its position within the fingers 22 on the plates 24, as the tension of the springs 52 force said forks to push the fruit into position and grip same in the operating center of the machine. The lever 104 is now swung forward, by the roller 117 traveling in the groove 118 of the cam wheel 90, causing the carriage 15 to move forward and return to the starting position, where it remains until the operations are again repeated, thus giving an interval of time during which the next fruit to be treated is introduced. As the carriage 15 moves forward, however, the studs 26 soon engage the rear tongue switches 33, causing each of said studs to travel in an outer groove adjacent to the curved guide bars 27, and thereby causing the sleeves 21 to turn on the vertical rods 19 so that the curved fingers 22 on each sleeve 21 move outward and away from the fingers on the neighboring sleeve, in order that they may clear the fruit which is now gripped and held by the forked-end bars 36 in the operating center of the machine, the plates 24 at the same time being withdrawn from under the fruit. As the carriage 15 continues in its forward movement, the studs 26 engage the tongues 28 and swing them on their pins 29 against the action of the springs 31 to permit said studs to pass. The connecting rods 97 now pull the cross-head 53 downward on the vertical guide bars 7 and 8, forcing the coring tube 58 and the sizing tube 54 through the fruit and causing the knife 62 to slit the portion of the fruit with rind outside of the sizing tube 54, as they descend with the cross-head. The plate 67 against the rear of the sizing tube 54 slides within said outer portion of the fruit with rind. When the coring and sizing tubes have descended so that their cutting edges are just above the upper pair of forked-end bars 36, the latter are rapidly withdrawn, by the action of the cam 130 which now causes the lever 126 and arms 120 to turn and consequently the roller 128 to push the lever castings 42 rearward against the action of the springs 52. When the cross-head 53 nears the lower end of its stroke, the coring tube 58 enters the annular space 18 and the sizing tube 54 encircles the block 16. The set collar 77 now engages the top of the boss 76 and prevents further descent of the rod 75 whereupon the curved plate 67 is caused to swing on the pivot pin 69 rearward and away from the sizing tube 54 against the action of the springs 79. The outer portion of the fruit with rind which has been parted by the knife 62 is thus removed from the sizing tube 54 and is thrown out to the rear of the machine. The cores are forced upward through the coring tube 58 and discharged from the top of same. When the cross-head 53 has finished its downward stroke and begins its upward stroke, the cored and sized fruit now within the sizing tube encounters the stripping ring 66 and is prevented thereby from a further upward movement, and as the cross-head continues upward the coring and sizing tubes are both withdrawn from said fruit. While the cross-head 53 is on its upward stroke, however, and as soon as the coring tube 58 and sizing tube 54 are high enough to clear the block 16, the carriage 14 is moved rapidly forward to the starting position, by means of the roller 114 traveling in the groove 115 of the cam wheel 90 and swinging the lever 103 forward, which in turn pulls the carriage 14. When the coring and sizing tubes have left the cored and sized fruit the latter becomes unsupported and drops through the opening in the table 1 onto a chute or conveyer not shown. It will now be noted that the fruit has been cored and sized in an automatic and efficient manner, and as these operations are repeated at the rate of about twenty-five per minute with fruit fed successively to the machine by hand, the rapidity of the treatment of the fruit is at least four times greater than heretofore, and at the same time the product is perfect on account of the accurate centering of the fruit by the apparatus described. By removing the coring tube the product will be a sized fruit only, which is at times demanded by the trade.

I claim:

1. A machine for treating fruit comprising, a receptacle for carrying the fruit to the operating position, a block, means for gripping and centering the fruit above said block, means for simultaneously coring and sizing and parting the outer portion with rind, means for removing said outer portion with rind from the sizing tube, and means for discharging the cored and sized fruit.

2. A machine for treating fruit comprising, a receptacle for carrying the fruit to the operating position, a block, means for gripping and centering the fruit above said block, means for simultaneously sizing and parting the outer portion with rind, means for removing said outer portion with rind from the sizing tube, and means for discharging the sized fruit.

3. In a machine for treating fruit, a cross-head, a sizing tube attached to same, a block upon which the fruit is treated, and means for gripping the fruit in the operating center of the machine.

4. In a machine for treating fruit, a cross-head, a sizing tube attached to same, a curved plate pivoted to said cross-head and normally held against one side of said sizing tube, and a knife at the opposite side of the sizing tube for slitting the outer portion of the fruit with rind.

5. In a machine for treating fruit, a cross-head, a sizing tube attached to same, a curved plate pivoted to said cross-head and normally held against said sizing tube, and means for imparting a reciprocating motion to said cross-head.

6. In a machine for treating fruit, a cross-head, a sizing tube attached to same, a curved plate pivoted to said cross-head and normally held against said sizing tube, means for imparting a reciprocating motion to said cross-head, and means for swinging said curved plate away from said sizing tube.

7. In a machine for treating fruit, a cross-head, a sizing tube, a bar depending from said cross-head, and a knife attached to said bar at its lower end, said knife touching the sizing tube.

8. In a machine for treating fruit, a cross-head, a coring tube bolted within said head, a sizing tube attached to said head, and an opening in said sizing tube for access to bolts clamping the coring tube.

9. In a machine for treating fruit, oppositely disposed longitudinally sliding bars having V-shaped extremities to center the fruit, and means for connecting said bars such that a movement of one produces a corresponding movement in the opposite direction of the other.

10. In a machine for treating fruit, oppositely disposed forked-end bars, means for connecting same such that a movement of one produces a corresponding movement in the opposite direction of the other, and means for adjusting the said bars, such that said forks will always be equi-distant from the longitudinal center line of the machine.

11. In a machine for treating fruit, oppositely disposed longitudinally sliding bars having V-shaped extremities to center the fruit, and means for connecting same such that a movement of one produces a corresponding movement in the opposite direction of the other, the forked ends being shaped so as to center various sizes of fruit.

12. In a machine for treating fruit, oppositely disposed longitudinally sliding bars having V-shaped extremities to center the fruit, means for connecting same such that a movement of one produces a corresponding movement in the opposite direction of the other, and a tension spring acting on said connections for normally causing the forked ends to grip a fruit.

13. In a machine for treating fruit, oppositely disposed longitudinally sliding bars having V-shaped extremities to center the fruit, means for connecting same such that a movement of one produces a corresponding movement in the opposite direction of the other, a tension spring for normally causing the forked ends to grip a fruit, and means for counteracting the tension of said spring to release said fruit.

14. In a machine for treating fruit, a plurality of oppositely disposed longitudinally sliding bars having V-shaped ends for centering the fruit, and means for operating same for the purpose described.

15. In a machine for treating fruit, a plurality of sleeves, oppositely disposed fingers secured to said sleeves, said fingers forming the sides of a receptacle for a fruit to be treated.

16. In a machine for treating fruit, a plurality of sleeves, oppositely disposed fingers secured to said sleeves, said fingers forming the sides of a receptacle for a fruit to be treated, and spaces between said fingers for admitting forks for gripping said fruit.

17. In a machine for treating fruit, a plurality of sleeves, oppositely disposed fingers secured to said sleeves, said fingers forming the sides of a receptacle for a fruit to be treated, spaces between said fingers for admitting forks for gripping said fruit, the lower finger on each sleeve being provided with a horizontal plate to support a fruit in said receptacle.

18. In a machine for treating fruit, a plurality of sleeves, oppositely disposed fingers secured to said sleeves, said fingers forming the sides of a receptacle for a fruit to be treated, spaces between said fingers for admitting forks for gripping said fruit, the lower finger on each sleeve being provided with a horizontal plate to support a fruit in said receptacle, and a carriage provided with vertical rods on which said sleeves are mounted.

19. In a machine for treating fruit, a plurality of sleeves, oppositely disposed fingers secured to said sleeves, said fingers forming the sides of a receptacle for a fruit to be treated, spaces between said fingers for admitting forks for gripping said fruit, the lower finger on each sleeve being provided with a plate to support a fruit in said receptacle, a carriage provided with vertical rods, means for operating said carriage, and means for swinging said fingers with the sleeves turning on said rods simultaneously while the carriage is moving.

20. In a machine for treating fruit, a cross-head, a sizing tube attached to same, a carriage, a block mounted on said carriage, means for moving said carriage until said block is coincident with the operating center of the machine, and means for withdrawing said carriage.

21. In a machine for treating fruit, a receptacle for receiving a fruit to be treated, and a block, the bottom of said receptacle just clearing the top of said block when operating.

22. In a machine for treating fruit, a receptacle for receiving a fruit to be treated, means for entering said receptacle and gripping said fruit, and a block under said receptacle.

23. In a machine for treating fruit, a receptacle for receiving a fruit to be treated, means for entering said receptacle and for gripping said fruit, and means for withdrawing said receptacle after the fruit has been thus gripped.

24. In a machine for treating fruit, a receptacle for receiving a fruit to be treated, means for entering said receptacle and for gripping the fruit, a block under said receptacle, and means for withdrawing said receptacle after the fruit has been gripped and when directly above said block.

In testimony whereof I affix my signature, in presence of two witnesses.

HENRY GABRIEL GINACA.

Witnesses:
I. P. KIMBALL,
ROBT. J. PRATT.

---

Copies of this patent may be obtained for five cents each, by addressing the "Commissioner of Patents, Washington, D. C."